(12) United States Patent  (10) Patent No.: US 7,948,972 B2
Mallya  (45) Date of Patent:  May 24, 2011

(54) SYSTEM AND METHOD FOR PROVIDING AN INTEGRATED COMMUNICATIONS MANAGER

(75) Inventor: Anand Mallya, Banglalore (IN)

(73) Assignee: Signal Networks Pvt. Ltd., Karnataka (IN)

( * ) Notice: Subject to any disclaimer, the term of this patent is extended or adjusted under 35 U.S.C. 154(b) by 1246 days.

(21) Appl. No.: 11/211,274

(22) Filed: Aug. 25, 2005

(65) Prior Publication Data

US 2006/0045077 A1  Mar. 2, 2006

Related U.S. Application Data

(60) Provisional application No. 60/604,416, filed on Aug. 25, 2004.

(51) Int. Cl.
*H04L 12/66* (2006.01)
*H04L 12/56* (2006.01)

(52) U.S. Cl. .................. 370/354; 370/352; 370/401

(58) Field of Classification Search ............. 370/236, 370/442, 493, 352, 354, 401
See application file for complete search history.

(56) References Cited

U.S. PATENT DOCUMENTS

| 6,973,037 | B1 * | 12/2005 | Kahveci | 370/236 |
| 2001/0050918 | A1 * | 12/2001 | Surprenant et al. | 370/442 |
| 2004/0213150 | A1 | 10/2004 | Krause et al. | |
| 2006/0153242 | A1 * | 7/2006 | Krause et al. | 370/493 |

OTHER PUBLICATIONS

Habraken et al., SAMS Teach Yourself Networking in 24 Hours, Apr. 28, 2004, SAMS, Chapter 14 TCP/IP.*
Habraken, et al., SAMS Teach Yourself Networking in 24 hours. SAMS Apr. 28, 2004, Chapter 14 TCP/IP, see entire document.

* cited by examiner

*Primary Examiner* — Ahmad F Matar
*Assistant Examiner* — Sonia Gay
(74) *Attorney, Agent, or Firm* — Peter A. Nieves; Sheehan Phinney Bass + Green

(57) ABSTRACT

A system and method for providing an integrated communications manager that enables change in a number of voice communication channels and/or data communication channels is provided. Generally, an integrated communication manager (hereafter, "device") contains at least two interfaces, where each interface is capable of receiving data and/or voice. A memory is located within the device, having software stored therein. A processor is also located within the device, and configured by the memory to: allow a user of the device to designate a number of data communication channels to be accommodated by the device; allow the user of the device to designate a number of voice communication channels to be accommodated by the device; and allow the user to personally change the designation of the number of data communication channels and voice communication channels in accordance with present needs.

18 Claims, 8 Drawing Sheets

ISDN CONFIGURATION SCREEN
200

Network Configuration

| Impedance | Signaling | Framing |

Network (CO) [CPE ▼]

Signal Type [PRI ▼]

PILOT NUMBER FOR VOICE [        ]    PILOT NUMBER FOR DATA [        ]

Channel Specification For Data (Default Voice)

☐ CHANNEL (1)  ☐ CHANNEL (2)  ☐ CHANNEL (3)  ☐ CHANNEL (4)  ☐ CHANNEL (5)  ☐ CHANNEL (6)
☐ CHANNEL (7)  ☐ CHANNEL (8)  ☐ CHANNEL (9)  ☐ CHANNEL (10) ☐ CHANNEL (11) ☐ CHANNEL (12)
☐ CHANNEL (13) ☐ CHANNEL (14) ☐ CHANNEL (15) ☐ CHANNEL (16) ☐ CHANNEL (17) ☐ CHANNEL (18)
☐ CHANNEL (19) ☐ CHANNEL (20) ☐ CHANNEL (21) ☐ CHANNEL (22) ☐ CHANNEL (23) ☐ CHANNEL (24)
☐ CHANNEL (25) ☐ CHANNEL (26) ☐ CHANNEL (27) ☐ CHANNEL (28) ☐ CHANNEL (29) ☐ CHANNEL (30)

[SUBMIT]

FIG. 4

| STATUS | | ALLOW OUTGOING | ☐ | ALLOW INCOMING | ☐ | ALLOW LOCAL CALL | ☐ |
|---|---|---|---|---|---|---|---|
| ALLOW STD CALL | ☐ | ALLOW ISD CALL | ☐ | INITIATE CONF. CALL | ☐ | ALLOW PAGING | ☐ |
| ALLOW DID | ☐ | ALLOW CLI | ☐ | ALLOW LCR | ☐ | ALLOW GRP | ☐ |
| CALL FWD NO. | | ALLOW CALL REG | ☐ | SET PIN | | EMERGENCY CALLS | ☐ |
| RESERVED FOR FUTURE USE | | | | | | | |

SUBMIT    RESET

PABX EXTENSION CONFIGURATION SCREEN
400

FIG. 5

ETHERNET CONFIGURATION SCREEN
500

SYSTEM NAME

☐ ENABLE TCP/IP

IP ADDRESS    SUBNET MASK

☐ ENABLE DHCP SERVER

ENTER CLIENT    ENTER CLIENT
IP POOL START    IP POOL END

☐ AUTOMATICALLY OBTAIN IP ADDRESS
FROM DHCP SERVER

SUBMIT

FIG. 6

SYSTEM AND METHOD FOR PROVIDING AN INTEGRATED COMMUNICATIONS MANAGER

CROSS-REFERENCE TO RELATED APPLICATION

This application claims priority to copending U.S. Provisional Application entitled, "Integrated Gateway Business Manager (IGBM)," having Ser. No. 60/604,416, filed Aug. 25, 2004, which is entirely incorporated herein by reference.

FIELD OF THE INVENTION

The present invention is generally related to communications, and more particularly is related to accommodating voice and data solutions on an integrated access device.

BACKGROUND OF THE INVENTION

The pace of communications convergence continues to accelerate as we enter the new century. Communications convergence dictates that business-critical network traffic, among other network traffic, requires convergence of voice/data and new bundled service paradigm. The need for voice/data communication in the industry is always increasing. Small business environments with a small-scale or medium-scale office require the transmission of voice and data through a single pipe. Telephone companies and specialized data and voice carriers are also poised to offer new competitive bundled T1/E1 integrated access, symmetric high-bit-rate digital subscriber loop (SHDSL), and fiber interface service to customers and have recently made announcements in the United States and other parts of the world to do so.

As is known by those having ordinary skill in the art, in accordance with a request for service, a central office provides a number of data communication channels and voice communication channels to a customer premises. In turn, the customer premise is capable of providing data communication via a number of data terminals, and voice communication via a number of voice terminals. Hardware is typically provided at the customer premises, where the hardware is specifically configured to handle the number of voice communication channels and data communication channels specifically requested from the central office.

Unfortunately, after having purchased hardware configured for accommodating the specified number of data communication channels and the specified number of voice communication channels, it is difficult, if not impossible, to change the hardware. It is quite often, however, that such a change of the hardware is required due to the modification in the number of voice communication channels and data communication channels received by the customer premises. As a result, the previously configured hardware is replaced by newly configured hardware, thereby adding expense and inconvenience.

Thus, a heretofore-unaddressed need exists in the industry to address the aforementioned deficiencies and inadequacies.

SUMMARY OF THE INVENTION

Embodiments of the present invention provide a system and method for enabling change in a number of voice communication channels and/or data communication channels. Briefly described, in architecture, one embodiment of the system can be implemented as follows. The system contains at least two interfaces, where each interface is capable of receiving data and/or voice. The system also contains a memory having software stored therein, and a processor configured by the memory to perform the steps of: allowing a user of the system to designate a number of data communication channels to be accommodated by the system; allowing the user of the system to designate a number of voice communication channels to be accommodated by the system; and allowing the user to personally change the designation of the number of data communication channels and voice communication channels in accordance with need of the data communication channels and the voice communication channels, through use of the system.

The present invention can also be viewed as providing methods for enabling a user to change a number of voice communication channels and/or data communication channels. In this regard, one embodiment of such a method, among others, can be broadly summarized by the following steps: determining if a number of communication channels provided by an apparatus are inadequate; if the number of communication channels are inadequate, requesting additional communication channels; receiving the requested additional communication channels; designating a desired number of voice communication channels and a desired number of data communication channels; and assigning the desired number of voice communication channels and data communication channels through the apparatus, without replacing the apparatus.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is an ISDN configuration screen, which may be displayed by the ICM of FIG. 2.

FIG. 5 is a PABX extension configuration screen, which may be displayed by the ICM of FIG. 2.

FIG. 6 is an Ethernet configuration screen, which may be displayed by the ICM of FIG. 2.

DETAILED DESCRIPTION

The present integrated communications manager (ICM) provides a user with the capability of assigning a specific number of communication channels to voice communication and a specific number of communication channels to data communication. Such assignment of communication channels to voice or data may be based upon the amount of use of channels utilized for voice communication. Alternatively, such assignment of communication channels to voice or data may be based upon the amount of use of channels utilized for data communication.

Figure 1:
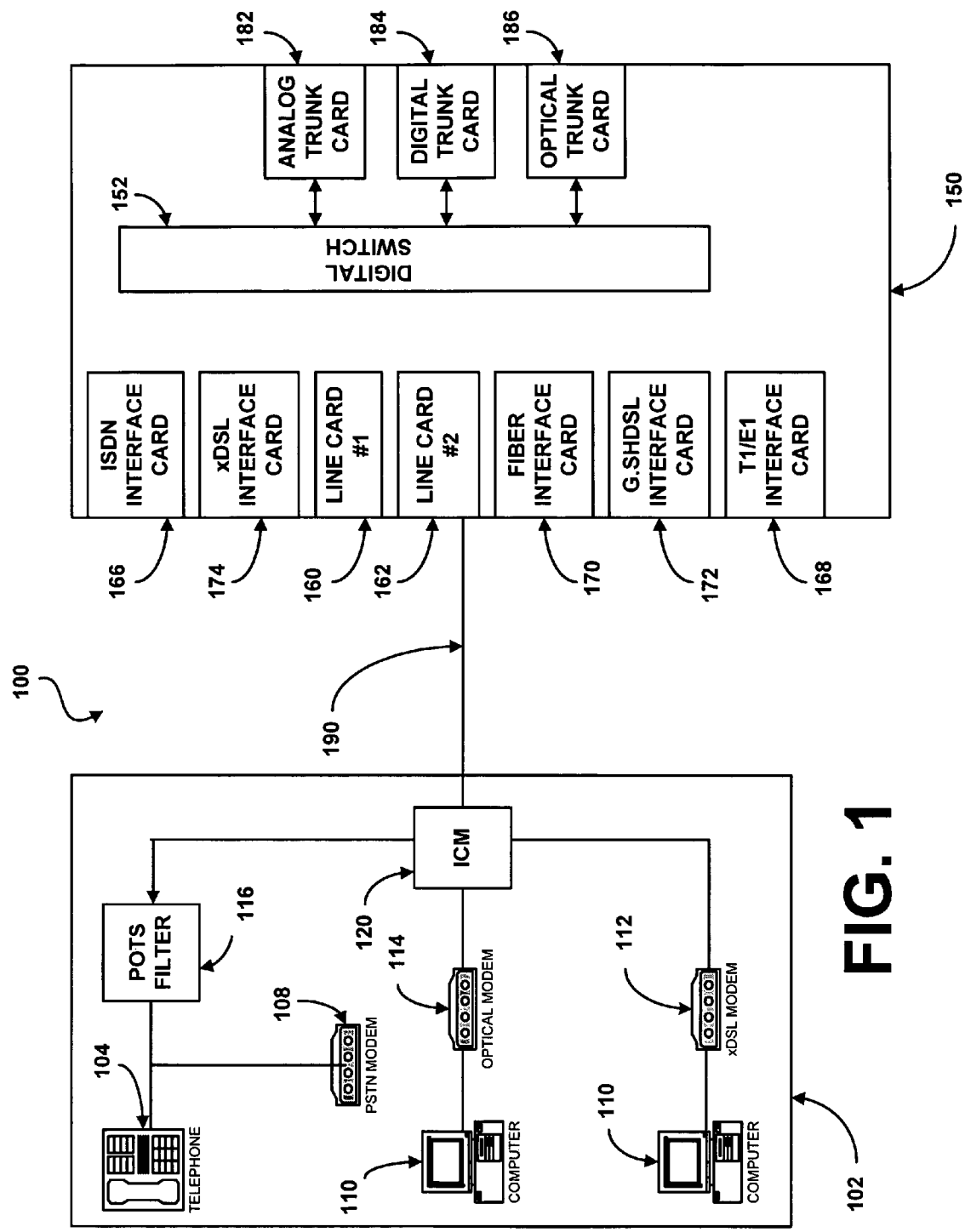
FIG. 1 is a block diagram illustrating a communication system that may use the Integrated Communications Manager (ICM), in accordance with the present invention.

FIG. 1 is a block diagram illustrating a communication system 100 in which the present ICM 120 may be implemented, in accordance with the present invention. A detailed description of the ICM 120, in accordance with the present invention, is provided below with regard to descriptions of FIG. 2, FIG. 3, FIG. 4, FIG. 5, and FIG. 6. While the following illustrates communication between a central office and a customer premises, it should be noted that the present ICM 120 system and method may be used for communication between a first customer premises and a second customer premises.

FIG. 1 illustrates communication between a customer premises 102 and a central office 150 via a local loop 190. It should be noted that if optical communication is provided between the customer premises 102 and the central office 150, the local loop 190 may be replaced with a fiber optic cable. While the customer premises 102 may be a single business, residence, hotel, or other entity, the customer premises 102 generally contains at least one computer 110, the ICM 120, plain old telephone service (POTS) equipment such as multiple telephones 104, a public switched telephone network (PSTN) modem 108, and a digital communication device, such as, but not limited to, a digital subscriber line (DSL) modem 112. Many categories of DSL may be provided for by the present invention. As a result, in FIG. 1 the DSL modem 112 is labeled as an xDSL modem. The term xDSL covers a number of DSL technologies, such as, for example, but not limited to, Asymmetrical Digital Subscriber Line (ADSL), Symmetrical Digital Subscriber Line (SDSL), Hi-Speed Digital Subscriber Line (HDSL), HDSL-2 (HDSLv2), ITU DSL standard (G.SHDSL), Integrated Services Digital Network (ISDN) Digital Subscriber Line (IDSL), and Very-High-Data-Rate Digital Subscriber Line (VDSL).

The present detailed description provides the example of the customer premises 102 being a small business containing multiple telephones 104 and multiple data connections, such as multiple computers 110, where each computer has an Internet connection. An example of such a small business may be, for example, a hotel where there may be approximately twenty (20) phone lines and ten (10) Internet connections. The computers 110 may be logically connected so as to allow the ICM 120 to control the number of channels providing data communication, even if not via the Internet, as is explained in more detail hereinbelow.

As is known by one having ordinary skill in the art, if a DSL service is provided by the customer premises 102, a POTS filter 116 may be located between POTS equipment (i.e., telephones 104) and the local loop 190. As is known, the POTS filter 116 may include a low pass filter having a cut-off frequency of approximately 4 kHz to 10 kHz, in order to filter high frequency transmissions from the xDSL modem 112 and protect the POTS equipment (i.e., telephone 104).

In an optical communication embodiment, the customer premises 102 may also contain an optical modem 114 for allowing modulation and/or demodulation of optical signals from and to the central office 150. One having ordinary skill in the art would understand how to implement and use an optical modem 114. Therefore, further explanation of use of an optical modem 114 is not provided herein.

Additional circuitry is provided at the central office 150. Generally, a line card 160 containing line interface circuitry is provided for electrical connection to the local loop 190. In accordance with the first exemplary embodiment of the invention, multiple line cards 160, 162 are provided, which may serve a plurality of local loops. Other circuit cards are also provided at the central office 150 for handling different categories of service. As an example, referring to FIG. 1, an integrated services digital network (ISDN) interface card 166, a T1/E1 interface card 168, and a fiber interface card 170 may be provided within the central office 150. It should be noted that, while the ISDN interface card 166 is shown as being separate from a T1/E1 interface card 168 and a fiber interface card 170, one having ordinary skill in the art would appreciate that the ISDN international communication standard may be utilized for providing communication via T1/E1 or fiber.

Another interface circuit card provided at the central office 150 may be a G.SHDSL interface card 172. As is known by those having ordinary skill in the art, G.SHDSL is an international standard for symmetric DSL (SDSL) developed by the international telecommunications union (ITU). G.SHDSL provides for sending and receiving high-speed symmetrical data streams over a single pair of copper wires at rates between 192 kbps and 2.31 Mbps. G.SHDSL was developed to incorporate the features of other DSL technologies, such as ADSL and SDSL and transports T1, E1, ISDN, Asynchronous Transfer Mode (ATM), and Internet Protocol (IP) signals. Of course, other DSL interface cards may be provided for enabling communication via other DSL technologies such as, but not limited to, SDSL, ADSL, HDSL, and VDSL. A representation of other DSL interface cards is designated in FIG. 1 as an xDSL interface card 174.

The central office 150 contains a digital switch 152 for providing communication with each of the various cards. On an outgoing side of the central office 150 (i.e., the side opposite the various local loops), a plurality of trunk cards are typically provided. As an example, an analog trunk card 182, a digital trunk card 184, and an optical trunk card 186 are illustrated in FIG. 1. Typically, these cards are outgoing lines that support numerous multiplexed transmissions and are typically destined for other central offices or long distance toll offices.

Communication between the customer premises 102 and the central office 150 is provided via the local loop 190. In accordance with the present exemplary embodiment of the invention, multiple different types of communication services are provided between the customer premises 102 and the central office 150. As a result, the local loop 190 may in fact be multiple local loops, where each local loop is associated with one specific type of communication service. Alternatively, a single local loop may be associated with different communication services.

Figure 2:
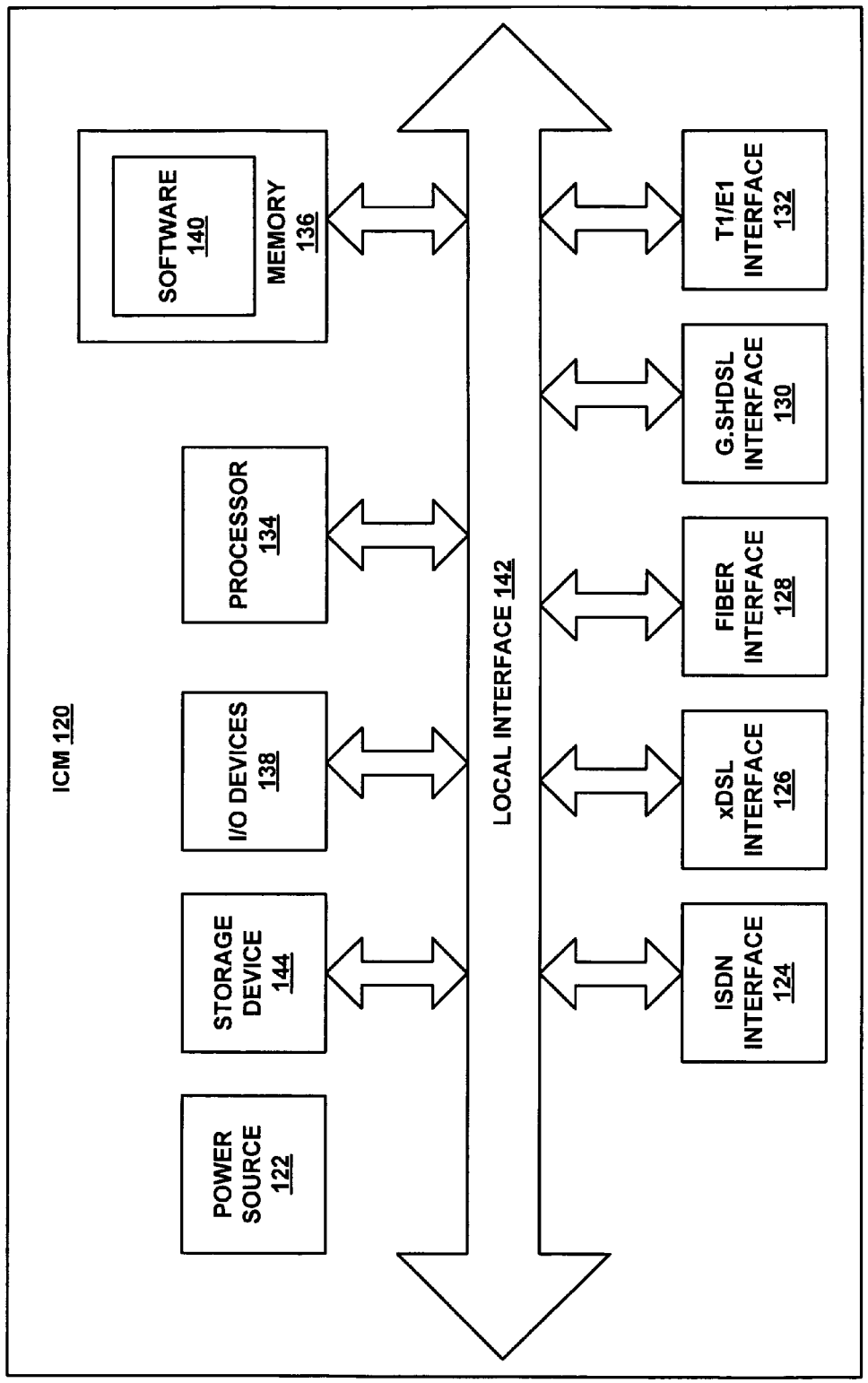
FIG. 2 is a block diagram further illustrating the ICM of FIG. 1, in accordance with a first exemplary embodiment of the invention.

FIG. 2 is a block diagram further illustrating the ICM 120 of FIG. 1, in accordance with the first exemplary embodiment of the invention. As is shown by FIG. 2, the ICM 120 offers many network integration features, as described in the following detailed description of the ICM 120. The ICM 120 contains a power source 122 that is capable of providing power to the ICM 120. While the power source 122 is illustrated as being located within the ICM 120, one having ordinary skill in the art would appreciate that the power source 122 may be located separate from the ICM 120 and connected to the ICM 120.

The ICM 120 contains multiple interface cards for allowing communication with the line cards 160, 162 and interface cards 166, 168, 170, 172, 174. Specifically, the ICM 120 contains an ISDN interface 124, an xDSL interface 126, a fiber interface 128, a G.SHDSL interface 130, and a T1/E1 interface 132. Of course, additional, or fewer line cards and/or interface cards may be provided within the ICM 120.

Functionality performed by the ICM 120 is partially implemented in software, as an executable program, where the ICM 120 may be a general-purpose digital computer, such as a personal computer (i.e., PC; IBM-compatible, Apple-compatible, or otherwise), workstation, minicomputer, or mainframe computer. An example of a general purpose computer that can implement the ICM functionality of the present invention is shown in FIG. 2. In FIG. 2, the software that defines functionality performed by the ICM 120 is denoted by reference numeral 140.

Generally, in terms of hardware architecture, as shown in FIG. 2, in addition to the interfaces 124, 126, 128, 130, 132, the ICM 120 also contains a processor 134, a memory 136, and one or more input and/or output (I/O) devices 138 (or peripherals) that are communicatively coupled via a local interface 142. In addition, the interfaces 124, 126, 128, 130, 132 are capable of communicating within the ICM 120 via the local interface 142.

The local interface 142 can be, for example but not limited to, one or more buses or other wired or wireless connections, as is known in the art. The local interface 142 may have additional elements, which are omitted for simplicity, such as controllers, buffers (caches), drivers, repeaters, and receivers, to enable communications. Further, the local interface 142 may include address, control, and/or data connections to enable appropriate communications among the aforementioned components.

It should be noted that the ICM 120 may also have a storage device (e.g., hard disk) 144 therein. The storage device 144 may be any nonvolatile memory element (e.g., ROM, hard drive, tape, CDROM, etc.). In addition, the storage device 144 may be connected within the ICM 120 via a hard disk interface (not shown). In accordance with an alternative embodiment of the invention, the storage device 144 may be a volatile memory element, although the loss of memory contents when power is removed, may not be desirable.

The processor 134 is a hardware device for executing the software 140, particularly that stored in memory 136. The processor 134 can be any custom made or commercially available processor, a central processing unit (CPU), an auxiliary processor among several processors associated with the computer, a semiconductor based microprocessor (in the form of a microchip or chip set), a microprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68 automated self-service series microprocessor from Motorola Corporation.

The memory 136 can include any one or combination of volatile memory elements (e.g., random access memory (RAM, such as DRAM, SRAM, SDRAM, etc.)) and nonvolatile memory elements. Moreover, the memory 136 may incorporate electronic, magnetic, optical, and/or other types of storage media. Note that the memory 136 can have a distributed architecture, where various components are situated remote from one another, but can be accessed by the processor 134.

The software 140 located in the memory 136 may include one or more separate programs, each of which comprises an ordered listing of executable instructions for implementing logical functions. In the example of FIG. 2, as mentioned above, the software 140 includes functionality performed by the ICM 120 in accordance with the present invention and possibly a suitable operating system (O/S). A nonexhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system essentially controls the execution of other computer programs, such as the software 140 associated with the ICM 120, and provides scheduling, input-output control, file and data management, memory management, and communication control and related services.

The ICM software 140 is a source program, executable program (object code), script, or any other entity comprising a set of instructions to be performed. When a source program, then the program needs to be translated via a compiler, assembler, interpreter, or the like, which may or may not be included within the memory 136, so as to operate properly in connection with the O/S. Furthermore, the ICM software 140 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 138 may include input devices, for example but not limited to, a keyboard, mouse, scanner, microphone, touch screens, etc. Furthermore, the I/O devices 138 may also include output devices, for example but not limited to, a printer, display, etc. Finally, the I/O devices 138 may further include devices that communicate both as inputs and outputs, for instance but not limited to, a modulator/demodulator (modem; for accessing another device, system, or network), a radio frequency (RF) or other transceiver, a telephonic interface, a bridge, a router, etc. In accordance with present invention, at least one of the I/O devices 138 is a display, such as a computer screen.

When the ICM 120 is in operation, the processor 134 is configured to execute the software 140 stored within the memory 136, to communicate data to and from the memory 136, and to generally control operations of the ICM 120 pursuant to the software 140. The software 140 and the O/S, in whole or in part, but typically the latter, are read by the processor 134, perhaps buffered within the processor 134, and then executed.

When at least a portion of the ICM 120 is implemented in software 140, as is shown in FIG. 2, it should be noted that the software 140 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The software 140 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the ICM 120 is implemented in hardware, the ICM 120 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the purposes of illustration, a partial software implementation of the invention is described herein. However, this example in no way should be considered limiting.

Configuration of the ICM 120 for providing and configuring a specific number of channels for data communication and a specific number of channels for voice communication may be performed, for example, through use of a series of displayed screens having configuration options therein. FIG. 3, FIG. 4, FIG. 5 and FIG. 6 are exemplary screen views illustrating options made available to a user of the ICM 120 for automatically configuring the ICM 120 to handle a modified number of voice communication channels and data communication channels.

Figure 3:
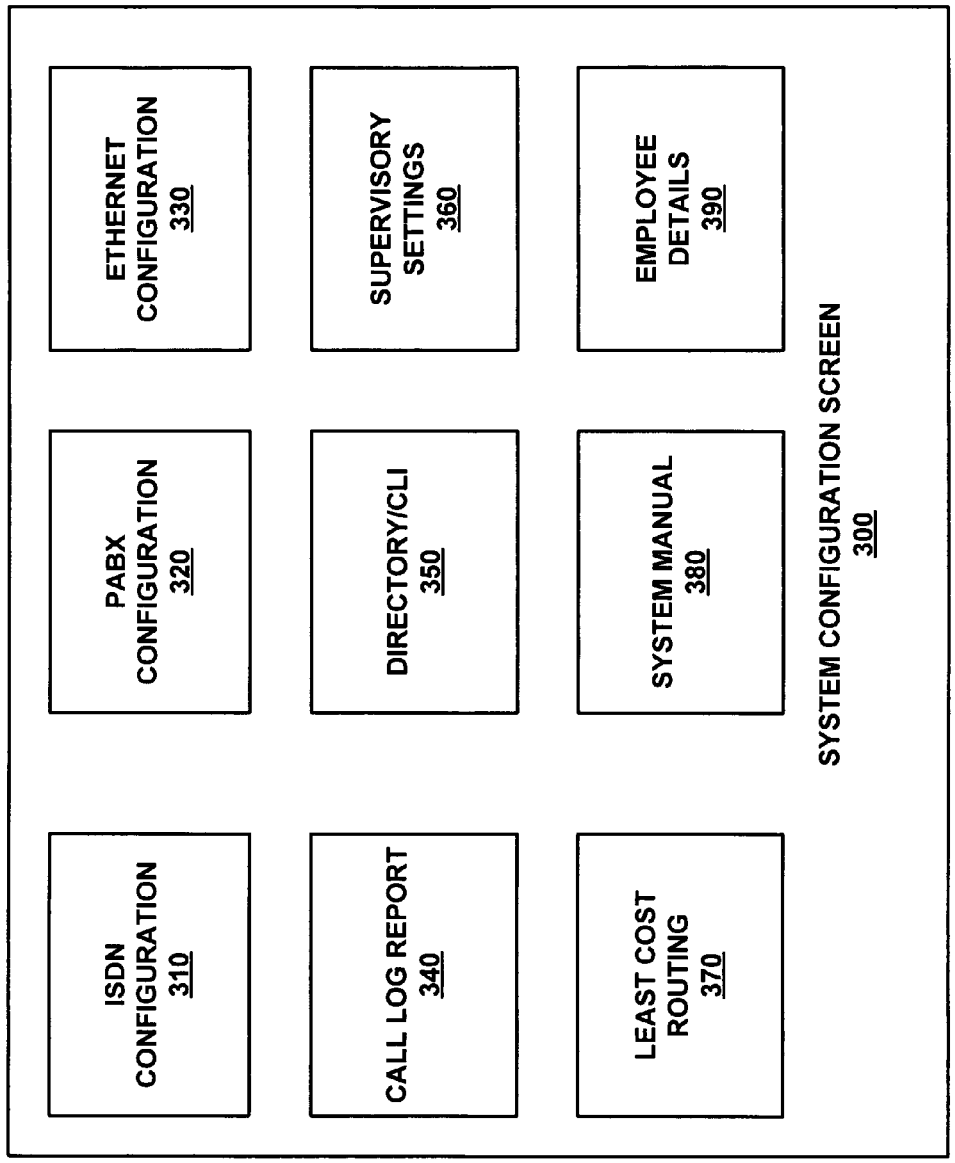
FIG. 3 is a system configuration screen illustrating options initially made available to a user of the ICM, in accordance with the first exemplary embodiment of the invention.

FIG. 3 is a system configuration screen 300 illustrating options initially made available to a user of the ICM 120, in accordance with the first exemplary embodiment of the invention. As shown by FIG. 3, the system configuration screen 300 contains the following options, which are accessible by selecting an associated icon displayed on the system configuration screen 300: ISDN configuration 310; private automatic branch exchange (PABX) configuration 320; Ethernet configuration 330; call log report 340; directory/caller ID 350; supervisory settings 360; least cost routing 370; system manual 380; and employee details 390.

It should be noted that access to the system configuration screen 300 may require entry and acceptance of a user name and password. Such a requirement may prevent an unauthorized user of the ICM 120 from changing settings of the ICM 120.

Referring to FIG. 3, selection of the ISDN configuration icon 310 causes display of an ISDN configuration screen 200, an example of which is shown by FIG. 4. It should be noted that additional options, not shown by FIG. 4, may be made available to the user, where such options are associated with ISDN configuration.

Referring to FIG. 4, the ISDN configuration screen 200 allows a user to select a network where the ICM 120 is located. As an example, the ICM 120 may be established as customer premise equipment (i.e., at the customer premises 102), as described thus far, or the ICM 120 may be established as network equipment, where the ICM 120 can reside at the central office 150. In addition, the user of the ICM 120 may select a signaling type (e.g., basic rate interface and primary interface), and a pilot number for both voice and data.

A number of channels are listed on the ISDN configuration screen 200, allowing the user to specify whether each channel should be used for data or voice communication. Each of the channels listed on the ISDN configuration screen 200 preferably has a default designation of being set for voice communication. Of course, the default designation may instead be set for data communication. It should be noted that the number of channels listed in the ISDN configuration screen 200 may change in accordance with the needs of the user. In addition, the ISDN configuration screen 200 may list more channels than are presently available, thereby allowing the ICM 120 to be modified by the user in accordance with present data and voice communication channel needs. The ISDN configuration screen 200 may also contain options for setting framing settings, signaling settings and impedance settings.

Returning to FIG. 3, selection of the PABX configuration icon 320 my result in displaying of a separate screen (not shown) where the user may configure extensions and groups associated with the PABX. As an example, an option may be provided to the user to select an extension number for the PABX settings. After selection of the extension number, a PABX extension configuration screen 400 may be displayed (FIG. 5).

As is shown by FIG. 5, the PABX extension configuration screen 400 may display many PABX extension configuration options. As an example, a user may select to allow or not allow outgoing calls, incoming calls, local calls, and viewing of PABX extension status. In addition, the user may select to allow or not allow subscriber trunk dialog (STD) calls, international subscriber dialing (ISD) calls, paging, direct inward dialing (DID) calls, caller identification, least cost routing (LCR), and/or regular calls. Options may also be available to initiate a conference call, provide a call forwarding number, and/or set a personal identification number. In addition, it is preferred that emergency calls are enabled default and that users or administrators cannot change this setting at any given point of time. Of course, in accordance with an alternative embodiment of the invention, users and/or administrators may be allowed to change the emergency call settings. Further, a user may reserve an extension for future use.

The PABX extension configuration screen 400 also contains an allow group option. The allow group option enables specifying of group configurations. In accordance with the example illustrated by FIG. 4, the ISDN configuration screen 200 illustrates a maximum of thirty (30) extensions. In such a situation, the ICM 120 may provide three groups (i.e., group00, group01, and group02), where each group has a maximum of ten (10) extensions each.

Selection of the Ethernet configuration icon 330 may result in display of an Ethernet configuration screen 500, an example of which is displayed by FIG. 6. As is shown by FIG. 6, the Ethernet configuration screen 500 provides many options to the user of the ICM 120. As an example, in the Ethernet configuration screen 500 the user can set the system name (i.e., hostname) and can select one out of three options, namely, to enable Transmission Control Protocol/Internet Protocol (TCP/IP), to enable Dynamic Host Configuration Protocol (DHCP) server, or to automatically obtain an IP address from the DHCP server. If the enable TCP/IP option is selected, TCP/IP will be enabled. In addition, the user may specify an IP address and a subnet mask.

If the enable DHCP server option is selected, the DHCP server will be enabled. In addition, the user may enter a client IP pool start address and a client IP pool end address. Further, if the user selects the option to automatically obtain an IP address, the ICM 120 automatically obtains the IP address from the DHCP server. It should be noted that the values specified in the Ethernet configuration screen 500 will be stored in respective files within the storage device 144. This is irrespective of users adding or subtracting data channels.

Selection of the call log report icon 340 may result in the display of a call log report screen (not shown). The call log report screen may allow a user of the ICM 120 to search a query extension-wise, either by date or by call type. As a result of a search, records containing call details, which may be stored within the storage device 144, may be displayed on the screen.

Selection of the directory/CLI icon 350 may result in the display of all customer directory information that stores information regarding their clients and displays this information when an incoming call occurs or whenever a customer wants to retrieve information on a required client.

Selection of the supervisory settings icon 360 may result in display of a supervisory settings screen (not shown) that allows a user to change passwords for access to the ICM 120. In addition, the supervisory settings screen may allow a user to select to set default values for PABX extension configurations and Ethernet configurations.

Selection of the least cost routing icon 370 results in selection of channels for outgoing calls and depends on the user and the central office 150. The user can set any channel for outgoing calls, such as, but not limited to, STD/ISD/LOCAL during a time period of a day, so as to cut down cost.

Selection of the system manual icon 380 initiates display of an ICM 120 system manual that provides instructions for use and configuration of the ICM 120. In addition, selection of the employee details icon 390 may result in display of an employee details screen (not shown). The employee details screen may allow searching for records associated with an employee by entry of a name, an employee identification number, or a different search string. It should be noted that employee information is stored within the storage device 144 prior to allowing searching. As an example, information associated with an employee that may be stored within the storage device 144 may include: an employee identification; name; age; sex; address; phone number; email address; extension number; and designation identification.

A number of additional icons may be made available through the system configuration screen 300 (FIG. 3). For example, a storage device parameters icon (not shown) may be available. Selection of the storage device parameters icon may result in the display of a number of fields requiring entry of information regarding the storage device 144 located within the ICM 120. As an example, such fields may include storage capacity of the storage device 144, and a form of identification, such as an identification number. Many features may be enabled with the entry of storage device parameters. As an example, the storage device parameters may be transmitted to a location remote from the ICM 120, thereby allowing a remotely located individual to replicate the storage device 144 at the remote location. Specifically, the remotely located individual may wish to copy all content of the storage device 144 located within the ICM 120. In such an instance, knowledge of the storage device 144 storage capacity and any other information necessary for allowing complete copying of the storage device 144, would be beneficial. In addition, via the storage device 144 interface, the storage device 144 may be removed. Therefore, information regarding the storage device 144, which was connected to the ICM 120 via, for example, a storage device interface, is valuable for replacement of the storage device 144 within the ICM 120.

The availability of the above-mentioned options made available by the ICM 120 provides the user of the ICM 120 with the capability to change, among other things, a number of voice and data channels made available at the customer premises 102. Specifically, the user is capable of configuring individual channels.

Figure 7:
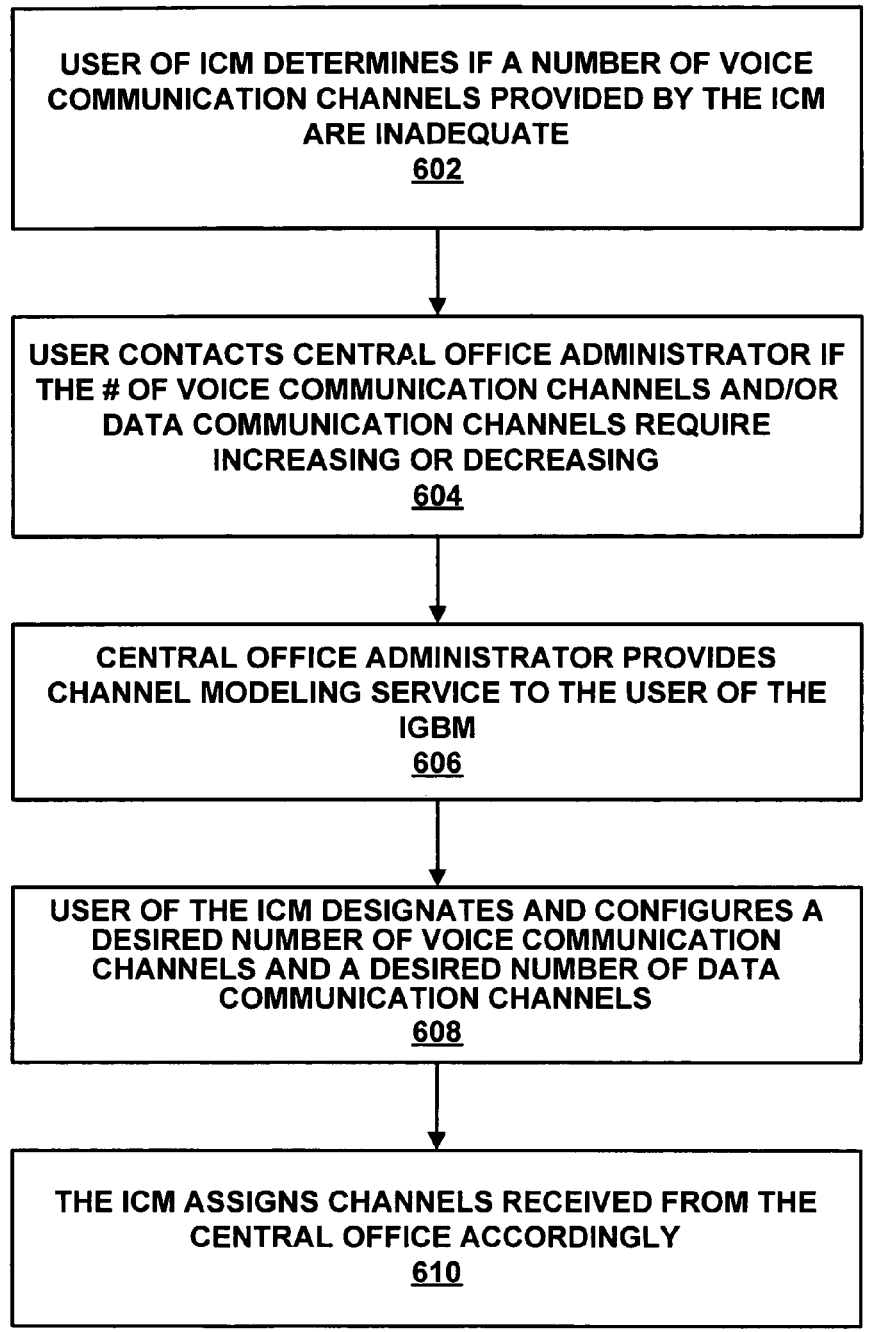
FIG. 7 is a flowchart illustrating steps taken in determining voice and data communication requirements and accommodating such requirements via use of the ICM of FIG. 2.

FIG. 7 is a flowchart 600 illustrating steps taken in determining voice and data communication requirements and accommodating such requirements via use of the ICM 120 of FIG. 2. In this regard, each block represents a module, segment, or portion of code, which comprises one or more executable instructions for implementing the specified logical function(s). It should also be noted that in some alternative implementations, the functions noted in the blocks may occur out of the order noted in FIG. 7. For example, two blocks shown in succession in FIG. 7 may in fact be executed substantially concurrently or the blocks may sometimes be executed in the reverse order, depending upon the functionality involved, as will be further clarified hereinbelow.

Referring to FIG. 7, a user of the ICM 120 determines if a number of voice communication channels provided by the ICM 120 are inadequate (block 602). This determination may be made by many different methods. As an example, the software 140 may contain functionality that is capable of determining a number of "off-hook" conditions, which represent when a telephone is off hook and a voice communication session is taking place. Therefore, the number of "off-hook" conditions at one time represents the number of voice communication channels that are being occupied at one time. If, for example, there are fifteen (15) voice communication channels and fifteen (15) "off-hook" conditions are received at one time, the user of the ICM 120 knows that additional voice communication channels are required. It should be noted that such a determination may be made by the user, or, in accordance with an alternative embodiment of the invention, automatically by the software 140.

If the number of voice communication channels and/or data communication channels require increasing or decreasing, the user of the ICM 120 contacts an administrator of the central office 150 to request the increase or decrease in voice communication channels and/or data communication channels (block 604). In response, the central office administrator provides a channel modeling service to the user (block 606). This channel modeling service provides channels that may be used for voice or for data. Negotiations with the central office administrator is associated with a number of channels, after which the channels may be used by the ICM 120 for voice communication or data communication.

The user of the ICM 120 then designates and configures a desired number of voice communication channels and a desired number of data communication channels (block 608). As mentioned above, designation of a desired number of voice communication channels and data communication channels is performed by using the ISDN configuration screen 200. In addition, configuration of the desired number of voice communication channels is performed by designating PABX extensions and properties associated with each PABX extension. Further, as mentioned above, configuration of the desired number of data communication channels is performed by specifying Ethernet configuration data (i.e., through the Ethernet configuration screen 500, FIG. 6). By enabling the user to actively designate and configure the ICM 120 in accordance with a desired number of voice communication channels and data communication channels, the ICM 120 allows for automatic compensation for increased or decreased voice and data communication channel usage.

After the user of the ICM 120 designates and configures the desired number of voice communication channels and data communication channels, the ICM 120 assigns channels received from the central office accordingly (block 610).

It should be noted that, while the above description of the steps taken in determining voice and data communication requirements and accommodating such requirements via use of the ICM 120 of FIG. 2, begins with determining if a number of voice communication channels provided by the ICM 120 are inadequate (block 602), in an alternative embodiment of the invention, the determination and accommodation may begin with determining if a number of data communication channels provided by the ICM 120 are inadequate.

Figure 8:
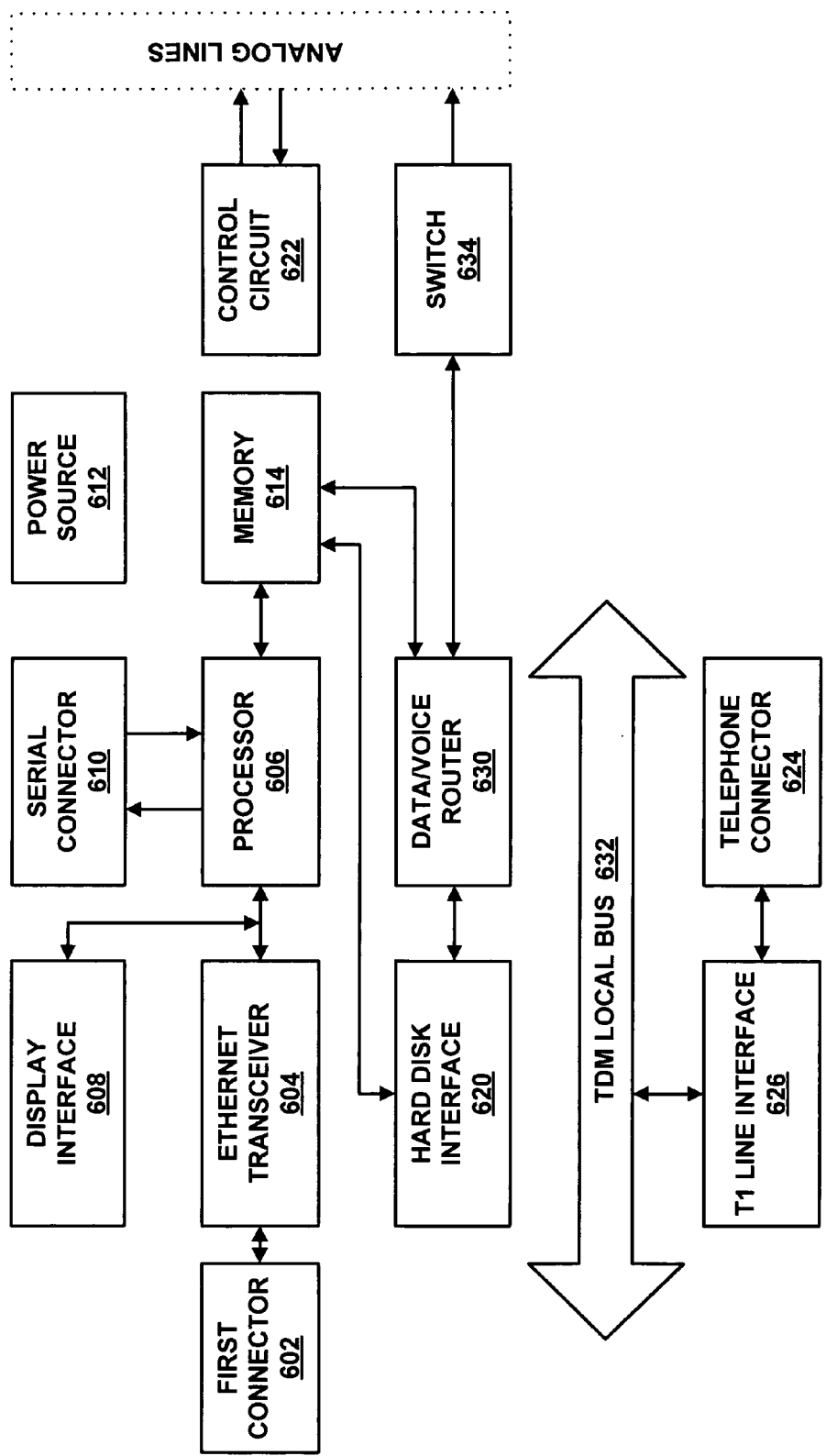
FIG. 8 is a block diagram further illustrating the ICM of FIG. 1, in accordance with a second exemplary embodiment of the invention.

FIG. 8 is a block diagram further illustrating the ICM of FIG. 1, in accordance with a second exemplary embodiment of the invention. It should be noted that portions of the ICM 600 described herein (i.e., in accordance with the second exemplary embodiment of the invention), that are the same as portions of the ICM 120 of the first embodiment of the invention, as described with reference to FIG. 2, perform similar functions.

As is shown by FIG. 8, the ICM 600 may contain a first connector 602 for allowing the computers 110 to connect to the ICM 600. An example of such a connector 602 may be a Registered Jack-45 (RJ-45) connector. The first connector 602 is connected to an Ethernet transceiver 604, which is connected to a processor 606. In addition, a display interface 608, or other I/O device, is connected to the processor 606. The ICM 600 may also have a serial connector 610 (e.g., a standard 232 (RS-232) connector) for allowing serial devices to connect to the ICM 600.

The ICM 600 contains a power source 612 that is capable of providing power to the ICM 600. While the power source 612 is illustrated as being located within the ICM 600, one having ordinary skill in the art would appreciate that the power source 612 may be located separate from the ICM 600 and connected to the ICM 600.

The ICM 600 also contains a memory 614 that is communicatively coupled to the processor 606, where, similar to the memory 136 of the first exemplary embodiment, software providing functionality as performed by the ICM 600, is stored therein. A hard disk interface 620 is located within the ICM 600 for allowing a hard disk (i.e., storage device) to connect to the ICM 600. In addition, analog communication lines may connect to the ICM 600 through a control circuit 622 that is capable of providing termination of the analog communication lines.

A telephone connector 624, such as, but not limited to, a Registered Jack-48 (RJ-48) connector, is provided within the ICM 600 and connected to a T1 line interface 626. The T1 line interface 626 may connect to a data/voice router 630, through a TDM local bus 632. In addition, a switch matrix 634 is provided within the ICM 600 for providing bifurcation capabilities.

In accordance with an alternative embodiment of the invention, the ICM 600 may also contain other interface cards for allowing communication with the line cards 160, 162 and interface cards 166, 168, 170, 172, 174, as shown with regard to the first exemplary embodiment of the invention (FIG. 2).

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus located within a customer premises for enabling change in a number of voice communication channels and/or data communication channels provided within said customer premises, comprising:
   at least two interfaces, where a first interface of said at least two interfaces is an integrated services digital network (ISDN) interface for providing communication with at least one voice communication channel, where a second interface of said at least two interfaces is a digital subscriber line (DSL) technology interface for providing communication with at least one data communication channel, and where each communication channel may be exchanged between being a voice communication channel or a data communication channel;
   a memory having software stored therein;
   a processor configured by said memory to perform the steps of:
      allowing a user of said apparatus to directly designate, within said customer premises, a number of data communication channels to be accommodated within said customer premises by said apparatus;
      allowing said user of said apparatus to designate, within said customer premises, a number of voice communication channels to be accommodated within said customer premises by said apparatus;
      allowing said user to personally change said designation of said number of data communication channels and voice communication channels in said customer premises in accordance with need of said data communication channels and said voice communication channels, through use of said apparatus; and
      directly physically changing the number of data communication channels and voice communication channels according to the designation of data communication channels and voice communication channels changed by the user,
      wherein both the voice communication channels and the data communication channels are provided over a local loop.

2. The apparatus of claim 1, further comprising a power source.

3. The apparatus of claim 1, wherein said at least two interfaces are selected from the group consisting of an ISDN interface, and an xDSL interface, a fiber interface, a G.SHDSL interface, and a T1/E1 interface.

4. The apparatus of claim 1, wherein said processor is further configured by said memory to perform the step of allowing said user of said apparatus to configure said data communication channels and said voice communication channels.

5. The apparatus of claim 4, where said step of configuring said data communication channels is performed via use of an Ethernet configuration screen, wherein said Ethernet configuration screen allows said user to perform the step of selecting to either enable Transmission Control Protocol/Internet Protocol (TCP/IP), enable Dynamic Host Configuration Protocol (DHCP) server, or to automatically obtain an IP address from the DHCP server.

6. The apparatus of claim 5, wherein said Ethernet configuration screen further allows said user to specify an IP address and a subnet mask if said user selects to enable TCP/IP.

7. The apparatus of claim 4, wherein said Ethernet configuration screen further allows said user to specify a client IP pool start address and a client IP pool end address, if said user selects to enable DHCP server.

8. The apparatus of claim 4, where said step of configuring said voice communication channels is performed via use of a PABX configuration screen that allows said user to assign properties to individual extension numbers.

9. The apparatus of claim 8, wherein said PABX configuration screen provides options selected from the group consisting of allowing outgoing calls, allowing incoming calls, allowing local calls, allowing paging, and allowing standard calls.

10. The apparatus of claim 8, wherein said PABX configuration screen provides options selected from the group consisting of allowing subscriber trunk dialog calls, allowing international subscriber dialing calls, allowing direct inward dialing calls, and allowing least cost routing calls.

11. A method of enabling change in a number of voice communication channels and/or data communication channels located within a customer premises having at least a first interface that is an integrated services digital network (ISDN) interface for providing communication with at least one voice communication channel and at least a second interface that is a digital subscriber line (DSL) technology interface for providing communication with at least one data communication channel; comprising the steps of:
  determining if a number of communication channels within a customer premises, which are provided by an apparatus located within said customer premises are inadequate;
  if said number of communication channels are inadequate, requesting additional communication channels;
  receiving said requested additional communication channels, wherein said additional communication channels can be used for either data or voice communication;
  within said customer premises, designating a desired number of voice communication channels and a desired number of data communication channels within said customer premises;
  assigning said desired number of voice communication channels and data communication channels within said customer premises through said apparatus located within said customer premises, without replacing said apparatus located within said customer premises; and
  directly physically changing the number of data communication channels and voice communication channels according to the designation of data communication channels and voice communication channels,
  wherein both the voice communication channels and the data communication channels are provided over a local loop.

12. The method of claim 11, wherein within said step of requesting additional communication channels, said request is provided to a central office.

13. The method of claim 11, further comprising the step of configuring said designated data communication channels and said designated voice communication channels.

14. The method of claim 13, where said step of configuring said designated data communication channels is performed via use of an Ethernet configuration screen, wherein said Ethernet configuration screen allows said user to perform the step of selecting to either enable Transmission Control Protocol/Internet Protocol (TCP/IP), enable Dynamic Host Configuration Protocol (DHCP) server, or to automatically obtain an IP address from the DHCP server.

15. The method of claim 14, wherein said Ethernet configuration screen further allows said user to specify an IP address and a subnet mask if said user selects to enable TCP/IP.

16. The method of claim 13, wherein said step of configuring said designated voice communication channels is performed via use of a PABX configuration screen that allows said user to assign properties to individual extension numbers.

17. The method of claim 16, wherein said PABX configuration screen provides options selected from the group consisting of allowing outgoing calls, allowing incoming calls, allowing local calls, allowing paging, and allowing standard calls.

18. A system for enabling change in a number of voice communication channels and/or data communication channels within a customer premises, comprising:
  a central office;
  a local loop connected to said central office;
  a customer premises connected to said local loop, said customer premises further comprising an apparatus therein, wherein said apparatus further comprises:
    at least two interfaces, where a first interface of said at least two interfaces is an integrated services digital network (ISDN) interface for providing communication with at least one voice communication channel, where a second interface of said at least two interfaces is a digital subscriber line (DSL) technology interface for providing communication with at least one data communication channel, and where each communication channel may be exchanged between being a voice communication channel or a data communication channel;
    a memory having software stored therein; and
    a processor configured by said memory to perform the steps of:
      allowing a user of said apparatus to directly designate within said customer premises a number of data communication channels to be accommodated within said customer premises by said apparatus;
      allowing said user of said apparatus to designate within said customer premises a number of voice communication channels to be accommodated within said customer premises by said apparatus;
      allowing said user to personally change said designation of said number of data communication channels and voice communication channels in said customer premises in accordance with need of said data communication channels and said voice communication channels, through use of said apparatus; and
    directly physically changing the number of data communication channels and voice communication channels according to the designation of data communication channels and voice communication channels by the user,
    wherein both the voice communication channels and the data communication channels are provided over a local loop.

* * * * *